United States Patent [19]

Gladden

[11] 4,188,364

[45] Feb. 12, 1980

[54] TWO-STAGE CATALYSIS OF ENGINE EXHAUST

[75] Inventor: John R. Gladden, Metamora, Ill.

[73] Assignee: Caterpillar Tractor Co., Peoria, Ill.

[21] Appl. No.: 924,420

[22] Filed: Jul. 13, 1978

Related U.S. Application Data

[63] Continuation of Ser. No. 802,205, May 31, 1977, abandoned.

[51] Int. Cl.$^2$ ............................................. B01D 53/34
[52] U.S. Cl. .............................. 423/213.2; 423/213.7; 422/171
[58] Field of Search ............... 423/213.2, 213.5, 213.7, 423/239; 23/288 FB; 422/171

[56] References Cited

U.S. PATENT DOCUMENTS

| | | | |
|---|---|---|---|
| 3,499,063 | 6/1969 | Griffing et al. | 423/213.2 |
| 3,599,427 | 9/1969 | Jones | 423/213.7 X |
| 3,895,094 | 7/1975 | Carter | 423/239 A |
| 3,970,739 | 7/1976 | Shiraishi et al. | 423/239 A |

FOREIGN PATENT DOCUMENTS 2341744  3/1974  Fed. Rep. of Germany ...... 423/239 A

OTHER PUBLICATIONS

Oka et al., "Hydrocarbon Processing;" Oct. 1974, pp. 113–114.

*Primary Examiner*—G. O. Peters
*Attorney, Agent, or Firm*—Phillips, Moore, Weissenberger, Lempio & Majestic

[57] ABSTRACT

The invention relates to reduction of nitric oxide in exhausts from hydrocarbon burning engines. The nitric oxide is reacted with ammonia over a first catalyst and then the excess ammonia is reacted with oxygen present in the exhaust gas over a second catalyst. The resulting effluent stream has greatly reduced nitric oxide content without having an objectionable content.

3 Claims, 1 Drawing Figure

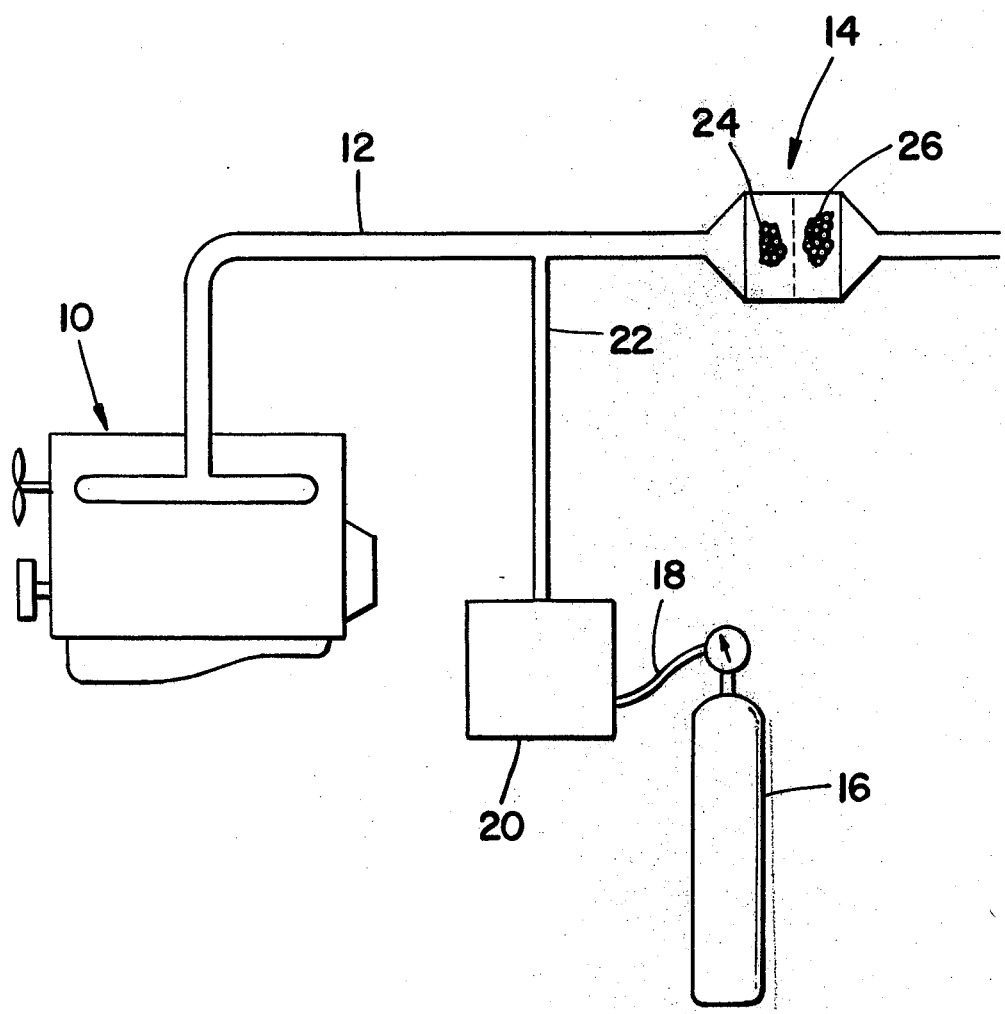
FIG_1

TWO-STAGE CATALYSIS OF ENGINE EXHAUST

This is a continuation, of Ser. No. 802,205, filed May 31, 1977 now abandoned.

BACKGROUND OF THE INVENTION

1. Field of the Invention

The invention relates to the catalytic purific action of engine exhaust streams to remove nitric oxide therefrom. More particularly, the invention relates to such a system wherein the nitric oxide content is reduced through reaction with ammonia.

2. Prior Art

It is well known to react a combusted gas stream from a hydrocarbon burning engine, which stream contains oxygen and nitric oxide among other components over a catalyst bed with ammonia, whereby the ammonia and nitric oxide react to reduce or substantially eliminate the nitric oxide. However, a problem has existed with such systems in that the ammonia to be effective must be in a high enough amount so that it serves to reduce substantially all of the nitric oxide to nitrogen. When this much ammonia is utilized, a problem is introduced in that excess ammonia escapes along with the exhaust stream from the catalytic reactor. At low loads, the mass flow of nitric oxide drops substantially. Consequently, not enough nitric oxide is supplied to react with ammonia absorbed on the catalyst surface at a sufficient rate to prevent the ammonia from being described and exhausted.

SUMMARY OF THE INVENTION

The present invention is directed to overcoming one or more of the problems as set forth above.

According to the present invention a process is provided for converting a combusted gas stream from a hydrocarbon burning engine into a nitric oxide free exhaust. The process comprises contacting a combusted gas stream comprising nitric oxide and oxygen with ammonia and a first catalyst bed having a nitric oxide-ammonia reaction catalyst comprising a porous inorganic oxide to form an effluent gas stream having oxygen, ammonia and a reduced nitric oxide content. The effluent gas stream is contacted with a second catalyst bed having an oxidation catalyst disposed on a porous inorganic oxide carrier to form a substantially nitric oxide free and ammonia free exhaust stream.

In another sense the invention comprise apparatus for carrying out the above process.

BRIEF DESCRIPTION OF THE DRAWING

The invention will be better understood by reference to the single FIGURE of the drawing wherein:

FIG. 1 schematically illustrates the process and apparatus of the present invention.

DETAILED DESCRIPTION OF THE PREFERRED EMBODIMENT

Adverting to FIG. 1, a hydrocarbon burning engine 10 which may be for example a gas turbine engine, a diesel engine, a gasoline engine, or any other nitric oxide source, produces a combusted gas stream comprising nitric oxide, gaseous hydrocarbons, unreacted oxygen, hydrogen and carbon monoxide which passes via a conduit 12 to a reactor 14. Ammonia from an ammonia storage tank 16 is introduced to the reactor 14 via a conduit 18, a conventional flow control device 20 and a conduit 22. The ammonia along with the combusted gas stream passes through conduit 12 to the reactor 14. Within the reactor 14 there are two catalyst beds. A first catalyst bed 24 serves to catalyze the reduction of nitric oxide through reaction with ammonia by the overall reaction $4NH_3 + 6NO = 5N_2 + 6H_2O$. A second catalyst bed 26 serves to catalyze the oxidation of ammonia, probably by the reactions:

(1) $4NH_3 + 6NO = 5N_2 + 6H_2O$;
(2) $2NH_3 + O_2 = N_2 + 3H_2O$; and
(3) $4NH_3 + 5O_2 = 4NO + 6H_2O$.

The second catalyst bed will also destroy carbon monoxide and hydrocarbons by oxidation reactions which may generally be represented by the reactions:

(1) $CO + 1/2O_2 = CO_2$
(2) $HC_s + O_2 = H_2O + CO_2$.

An effluent gas stream from the first catalyst bed 24 passes directly into the second catalyst bed 26. It will be noted that while in FIG. 1 both catalyst beds are shown within a single reactor 14, it is contemplated as being within the scope of the present invention to use two separate reactors to replace the single reactor 14. Sufficient unreacted oxygen is generally present in the combusted gas stream for reaction on the second catalyst bed 26, although, if desired, additional oxygen may be conventionally introduced thereto.

Reaction (3) is clearly undesirable since it leads to the formation of nitric oxide. However, experimental testing has shown that this reaction is relatively unimportant at combusted gas stream temperatures of about 315° C. and below and that when the temperature of the combusted gas stream is above about 315° C. (high load conditions) almost all of the ammonia reacts or is retained at first catalyst bed 24 so that there is no significant amount of ammonia introduced to second catalyst bed 26 for reacting thereto. Thus, ammonia is contacted in significant amounts with the second catalyst bed 26 only when the load (and temperature) drops, e.g., only at temperatures below about 315° C. As previously mentioned, only equations (1) and (2) represent siginificant reactions at temperatures below about 315° C. and these reactions do not lead to nitric oxide production.

The first catalyst bed 24 may include any of a number of known porous inorganic oxide catalysts for catalyzing the reduction of nitric oxide with ammonia. The porous inorganic oxide can comprise, for example, alumina, zirconia, silica, magnesia, silica-alumina, silica-magnesia, alumina-magnesia, alumina-silica-magnesia, pumice, alundum, titania, titania-magnesia, titania-silica, titania-alumina, titania-silica-alumina, titania-magnesia-alumina, and the like. It is generally preferred that the surface area of the porous inorganic oxide be at least about 10 m²/g. Generally, a surface area of above about 50 m²/g is preferred. The surface area should generally not exceed about 750 m²/g and more preferably should not exceed about 500 m²/g. Generally, the average pore volume of the porous inorganic oxide will fall within a range from about 0.1 ml/g to about 1.5 ml/g and more preferably from about 0.2 ml/g to about 0.9 ml/g. Particularly good catalysts consisting of metals or metal oxides on alumina are molybdate of alumina, vanadium on alumina, iron-chromium on alumina, and copper on alumina. The inorganic oxide can be a naturally or synthetically produced inorganic oxide or a combination of inorganic oxides and for full and proper realization of all of the advantages of the present invention should preferably comprise a zeolitic aluminosilicate (zeolite).

Zeolites are particularly preferred and their use is indeed usually necessitated in order to attain sufficiently high catalytic activity. Also, the zeolites exhibit a high degree of selectivity for catalyzing the reaction between ammonia and nitric oxide. Many naturally or synthetically produced zeolites can be used. X, Y, and Z zeolites and synthetic mordenites may be used. Generally it is preferred that the hydrogen form of the zeolite be used since this is especially selective for the reaction between ammonia and nitric oxide. However, rare earth exchanged zeolites, ammonium exchanged zeolites, mordenite zeolites, and non-zeolites such as copper on alumina, molybdate on alumina, vanadia or alumina, iron-chromium on alumina and gadolinium-vanadium on alumina have also been successfully used as catalysts. Generally, mordenite zeolites have been used more successfully. Such zeolites are described in great detail in U.S. Pat. No. 3,436,174 or L. B. Sand, patented Apr. 1, 1969. Any of the mordenite zeolites discussed in that patent is useful with varying degrees of efficiency in the practice of the present invention. A number of Y zeolites useful in the practice of the present invention are described in U.S. Pat. No. 3,130,007 of D. W. Breck, patented Apr. 21, 1964. A number of X zeolites useful in the practice of the present invention are described in U.S. Pat. No. 2,882,244 of R. M. Bolten, patented Apr. 14, 1959. Once again the particular efficiency of each X type zeolite varies but all of these zeolites work successfully in the practice of the present invention although at different degrees of efficiency.

The reaction upon the first catalyst bed 24 should take place at a temperature which falls within a range from about 200° C. to about 800° C. This reaction should proceed at a gaseous hourly spaced velocity (at reaction conditions) which falls within a range from about 3,000/hr. to about 40,000/hr. This serves to allow relatively complete reaction of a nitric oxide with the ammonia.

The second catalyst bed 26 must contain a catalyst of the strong oxidizing type. That is, it must contain a catalyst which will strongly catalyze the oxidation of the ammonia by any oxygen or nitric oxide present and will at the same time oxidize carbon monoxide to carbon dioxide and hydrocarbons to carbon dioxide and water. In order that the catalyst shall be sufficiently active, it should be disposed on a porous inorganic oxide carrier or the like. Generally, the catalyst 26 will comprise a Group VIII noble metal such as platinum, palladium, ruthenium, rhodium, osmium, iridium, or the like or mixtures thereof included on a porous solid catalyst, generally a porous inorganic oxide carrier such as alumina or the like. More generally, the metal disposed on the porous inorganic oxide carrier may comprise any of the abovementioned noble metal components, the elements of Group IB, i.e., copper, silver and gold, the elements of Group II B, i.e., zinc, cadmium, and mercury, the elements of Group VIB, i.e., chromium, molybdenum and tungsten and the elements of Group VA and particularly bismuth. The rare earths are also useful catalysts and, indeed, allow the use of particularly high space velocity for substantially complete reaction. Combinations of the above components are also useful. The preferred catalyst will generally consist of either a copper component and a chromium component included with the porous inorganic oxide carrier or a platinum component and a pallium component included with the porous inorganic oxide carrier. The amounts of the metal component used will vary greatly depending upon the particular component chosen. For example, relatively large amounts of copper and/or chromium, generally in the range from about 1% to about 10% by weight may be required. On the other hand, when a Group VII B noble metal catalyst component is used it will generally be used in an amount of less than 1% and more usually in an amount of less than about 0.5%, generally in the range from about 0.05% to about 0.5%, based upon the weight of the carrier.

The porous carrier support can comprise, for example, porous ceramic spheres, tablets or rings, alumina, zirconia, silica, magnesia, silica-alumina, silica-magnesia, alumina-magnesia, alumina-silica-magnesia, certain higher surface area carbons, pumice, alundum, titania, titania-magnesia, titania-silica, titania-alumina, titania-silica-alumina, titania-magnesia-alumina, and the like. It is generally preferred that the surface area of the porous solid carrier be at least about 10 m$^2$/g. Generally, a surface area of about 50 m$^2$/g is preferred. Generally the surface are will not exceed about 750 m$^2$/g and more prefereably will not exceed about 500 m$^2$/g. Generally, the average pore volume of the porous solid carriers will fall within a range from about 0.1 ml/g to about 1.5 ml/g and more preferably from about 0.2 to about 0.9 ml/g.

The particle size of the porous solid carrier will generally fall within a range from about 0.1 inch to about 5 inch. The substrate can also be fabricated into a honeycomb monolith.

The temperature within the catalyst bed 26 must fall within a range from about 200° C. to about 800° C. and the gaseous hourly space velocity (at reaction conditions) will generally fall within a range from about 10,000/hr. to about 120,000/hr. The actual temperature range of ammonia removal will be from about 200° C. to about 315° C., since, as previously mentioned, ammonia is held up or reacted on the first catalyst bed 24 at higher temperatures (and loads). The gases which exit the catalyst 26 will generally be both ammonia and nitric oxide free.

It is preferable to the practice of the present invention that sufficient ammonia be used and that the space velocity at the catalyst bed 24 and the activity of said catalyst in the bed 24 be such that substantially all of the nitric oxide is converted to nitrogen. However, amounts of ammonia below that needed for a stoichiometric reaction with the nitric oxide may be used. Thus, from about 0.5 to about 2 times the stoichiometric amount of ammonia may be used. Preferably, however, at least a stoichiometric amount of ammonia is utilized to react with the nitric oxide and, generally, somewhat of an excess of ammonia will be used.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. A method of removing nitric oxide from a hydrocarbon burning engine exhaust stream, the engine operating under varying load conditions from a high load to a low load wherein the exhaust stream temperature varies from a high of about 800° C. to a low of about 200° C., comprising:

contacting a combusted gas stream comprising nitric oxide and oxygen with ammonia, the contacting over a first catalyst bed having a catalyst comprising a zeolite which catalyzes a reductive reaction of ammonia with nitric oxide, the amount of ammonia from about 0.5 to about 2 times the stoichiometric amount for the reductive reaction of ammonia with nitric oxide, the contacting at a temperature between about 200° C. to about 800° C., the first catalyst bed retaining ammonia when the temperature is above about 315° C. and desorbing a portion of the ammonia at a temperature from about 200° C. to about 315° C., to form an effluent gas stream having oxygen, a reduced amount of nitric oxide content, and having the desorbed portion of ammonia when said contacting is at a temperature from about 200° C. to about 315° C.; and contacting said effluent gas stream with a second catalyst bed comprising a porous solid carrier having a catalytically active oxidation catalyst metal disposed thereon which is sufficiently active to catalyze the oxidation of the desorbed portion of ammonia to form a substantially nitric oxide free and ammonia free exhaust stream.

2. A process as in claim 1, wherein said first catalyst bed contacting is at a gaseous hourly space velocity at reaction conditions which falls within a range from about 3000/hour to about 40,000/hour and said second catalyst bed contacting is at a gaseous hourly spaced velocity at reaction conditions which falls within a range from about 10,000/hour to about 120,000/hour.

3. A process as in claim 1 wherein said second catalyst comprises a porous inorganic oxide carrier.

* * * * *